US008351868B2

(12) United States Patent
Garra et al.

(10) Patent No.: US 8,351,868 B2
(45) Date of Patent: Jan. 8, 2013

(54) RADIO STATUS INDICATOR (75) Inventors: LanTing L. Garra, Sunrise, FL (US);
Kenneth M. Reitz, Jr., Totowa, NJ (US);
Craig F Siddoway, Davie, FL (US)

(73) Assignee: Motorola Solutions, Inc., Schaumburg, IL (US)

(*) Notice: Subject to any disclaimer, the term of this patent is extended or adjusted under 35 U.S.C. 154(b) by 379 days.

(21) Appl. No.: 12/622,961

(22) Filed: Nov. 20, 2009

(65) Prior Publication Data

US 2011/0124383 A1    May 26, 2011

(51) Int. Cl.
*H04B 1/38* (2006.01)

(52) U.S. Cl. .................. 455/90.2; 455/90.3; 455/154.1; 455/159.1; 455/566; 455/575.1; 345/39; 340/815.4; 340/815.45

(58) Field of Classification Search .............. 455/3.05, 455/73, 66.1, 90.2, 90.3, 128, 157.2, 159.1, 455/343.1–343.6, 347, 517, 518, 550.1, 566, 455/567, 572, 573, 575.1; 345/39, 82, 183; 340/815.4, 815.45
See application file for complete search history.

(56) References Cited

U.S. PATENT DOCUMENTS

| 6,438,390 | B1 * | 8/2002 | Awan ............................. 455/566 |
| 6,542,757 | B2 | 4/2003 | Bae |
| 6,616,080 | B1 | 9/2003 | Edwards et al. |
| 7,086,512 | B2 | 8/2006 | Shack et al. |
| D542,026 | S * | 5/2007 | Gotlieb .......................... D3/211 |
| 7,310,500 | B2 * | 12/2007 | Fujiki .......................... 455/90.1 |
| 7,574,361 | B2 | 8/2009 | Yeager et al. |
| 7,782,602 | B2 | 8/2010 | Zhu |
| 8,044,815 | B2 * | 10/2011 | Du et al. ................... 340/636.13 |
| 8,090,130 | B2 | 1/2012 | Zorkendorfer et al. |
| 8,170,231 | B2 | 5/2012 | Garra et al. |
| 2003/0198355 | A1 | 10/2003 | Hong et al. |
| 2004/0022395 | A1 | 2/2004 | Turnbull |
| 2004/0229250 | A1 | 11/2004 | Figura et al. |
| 2005/0142141 | A1 | 6/2005 | Pardridge et al. |
| 2005/0210340 | A1 | 9/2005 | Townsend et al. |
| 2006/0013429 | A1 | 1/2006 | Ohta |
| 2006/0287006 | A1 | 12/2006 | McIntyre et al. |
| 2008/0204268 | A1 | 8/2008 | Dowling et al. |
| 2010/0155550 | A1 | 6/2010 | Weiss-Vons |

(Continued)

FOREIGN PATENT DOCUMENTS

EP    1839694 A1    10/2007

(Continued)

OTHER PUBLICATIONS

PCT International Search Report Dated Jun. 10, 2011.

(Continued)

*Primary Examiner* — Anthony Addy
(74) *Attorney, Agent, or Firm* — Barbara R. Doutre; Daniel R. Bestor (57) ABSTRACT

A portable communication device includes a status indictor in the form of a single multicolor generating LED. The single LED indicates radio channel and battery status. The LED is responsive to a menu button press to indicate a current channel by color. Channel change is indicated by changing to another color. The LED is also responsive to a power button on the portable communication device to generate predetermined colors associated with battery status. The use of a single LED eliminates the need for knobs or a display as part of the status indicator of the portable communication device.

8 Claims, 5 Drawing Sheets

U.S. PATENT DOCUMENTS

2010/0182507 A1* 7/2010 Haggis et al. .............. 348/570
2010/0244738 A1* 9/2010 Aiso .............................. 315/297

FOREIGN PATENT DOCUMENTS

KR     2003-0065592 A      8/2003
KR     10-0822725 B1       4/2008

OTHER PUBLICATIONS

International Search Report and Written Opinion for related International Application No. PCT/US2010/052133 mailed on Feb. 22, 2011.

International Preliminary Report on Patentability and Written Opinion for counterpart International Application No. PCT/US2010/052164 mailed on May 31, 2012.

International Preliminary Report on Patentability and Written Opinion for related International Application No. PCT/US2010/052133 mailed May 31, 2012.

Non Final Office Action mailed Oct. 12, 2011 in related U.S. Appl. No. 12/623,344, LanTing L. Garra, filed Nov. 20, 2009.

Final Office Action mailed Feb. 6, 2012 in related U.S. Appl. No. 12/623,344, LanTing L. Garra, filed Nov. 20, 2009.

Notice of Allowance mailed Mar. 19, 2012 in related U.S. Appl. No. 12/623,344, LanTing L. Garra, filed Nov. 20, 2009.

Braun, S., et al., Metabolic correction and cross-correction of mucopolysaccharidosis type II (Hunter syndrome) by retroviral-mediated gene transfer and expression of human iduronate-2-sulfatase, Proc. Natl. Acad. Sci. USA, Dec. 1993, vol. 90, pp. 11830-11834.

NCBI Reference Sequence: NM_000202.5, "Homo sapiens iduronate 2-sulfatase (IDS), transcript 1-72 variant 1, mRNA," 1992, 10 pages, accessed at http://www.ncbi.nlm.nih.gov/nuccore/NM_000202.5.

* cited by examiner

RADIO STATUS INDICATOR

RELATED CASE

This application is related to application Ser. No. 12/623,344 being filed concurrently herewith.

FIELD OF THE DISCLOSURE

The present disclosure relates generally to portable communication devices and more particularly to status indicators for portable radios.

BACKGROUND

Portable communication devices, particularly portable two-way radios, typically offer several features and controls on a single handheld device, such as channel change knobs, one or more displays, volume control, keypad and push-to-talk (PTT) button. Traditionally, portable two-way radios used in the public safety environment include channel change controls with channel indicators in the form of numbers or letters disposed around the channel knob and/or displayed on the display. The use of portable two-way radios in other types of environments, such as business environments, is increasing in popularity as a means of increasing productivity and efficiency in the workplace. Adapting the portable two-way radio to the needs of these new users is both desirable and challenging.

The manner in which portable two-way radio devices are used depends on what type of individual is operating the device, and the type of environment within which the device is being operated. For example, a public safety employee working in a public safety environment may be familiar with and require multiple operating features and controls on a single device. Other users, such as employees working in retail environments or restaurant environments may have completely different outlooks and expectations of how a portable two-way radio should be incorporated within their workspace. In business type environments, a smaller, more streamlined and scaled down product may be desirable. Providing a user-friendly interface presents a challenge when integrating numerous features and controls on a smaller size device. The need to balance the sophistication of controls and features on a portable two-way radio thus varies with different types of users and user environments.

Accordingly, it would be beneficial to have a user interface for a portable two-way radio directed towards a business environment, such as a retail or restaurant environment.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method, steps and apparatus components related to providing a portable communication device with a user friendly interface. The portable communication device is a streamlined, palm sized device having no display and no dedicated channel control knob. The user interface formed in accordance with the embodiments described herein is well suited for such a device. To this end, the portable communication device comprises a housing having electronics. A single multicolor generating light emitting diode (LED) is coupled to the housing and electronics to provide a plurality of radio status indicators, including channel status, transmit mode, receive mode, and battery status. A combination of predetermined LED colors and predetermined pulsing or blinking rates allows a user to have a visual indication of the radio's status. A menu button in conjunction with a volume up/down button is used to control channel change. A power button is used to enable the battery status check. Thus, use of the single multicolor LED allows for a compact radio form factor that allows visual feedback of the radio status without the use of a display and without the use of a dedicated numbered or lettered channel control knob.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

Figure 1A:
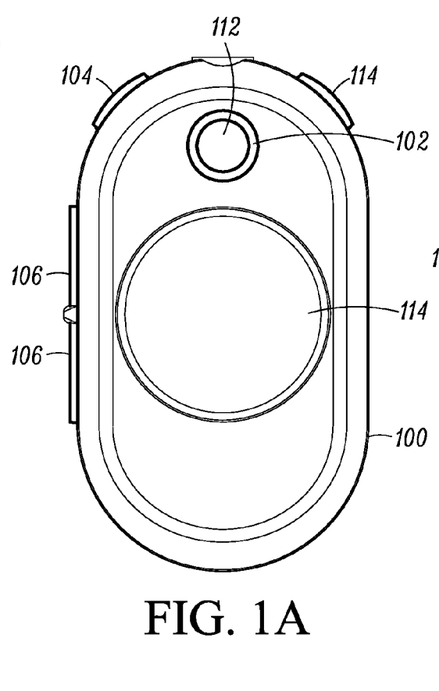
FIG. 1 is portable two-way radio having a radio status indicator formed in accordance with some embodiments.

FIGS. 1A-1E show various views (front, top, first side, second side, and back) of a battery powered portable communication device formed in accordance with some embodiments. For the purposes of this application, the battery powered portable communication device comprises a portable radio 100 having transceiver circuitry for use with an appropriate accessory, such as an earpiece. The traditional portable radio form factor has been redefined by including only essential elements within this palm-sized device. A minimum number of controls are used to maximize user features without the use of a dedicated channel control knob or display. In accordance with some embodiments, portable radio 100 comprises a single multicolor LED 102 and a power button 104 for turning the radio on and off as seen in FIG. 1A. In accordance with the embodiments, the single multicolor LED 102 is used to indicate a plurality of radio modes and battery status. The radio modes provided by the LED 102 include active channel, radio transmit and receive modes. The battery status provided by the LED 102 includes a plurality of indicators including high, medium, critical and critical battery status. The single multicolor LED 102 automatically indicates each of the plurality of modes through changes in color and predetermined pulsation rates of those colors.

Figure 1B:
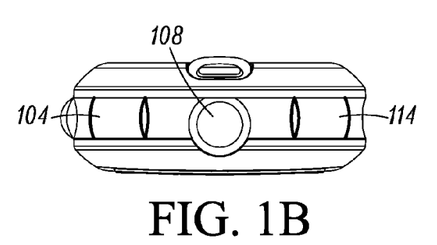
Figure 1C:
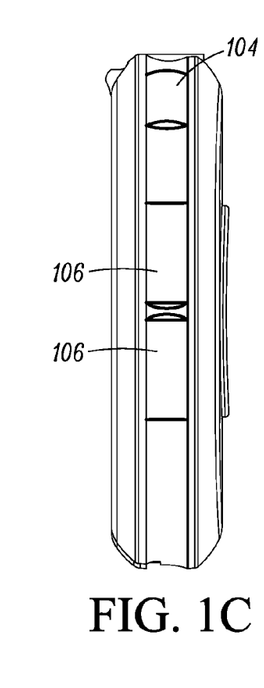
Figure 1D:
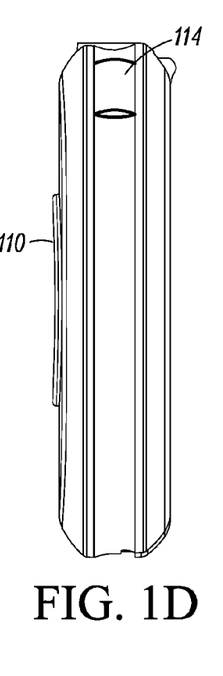
Figure 1E:
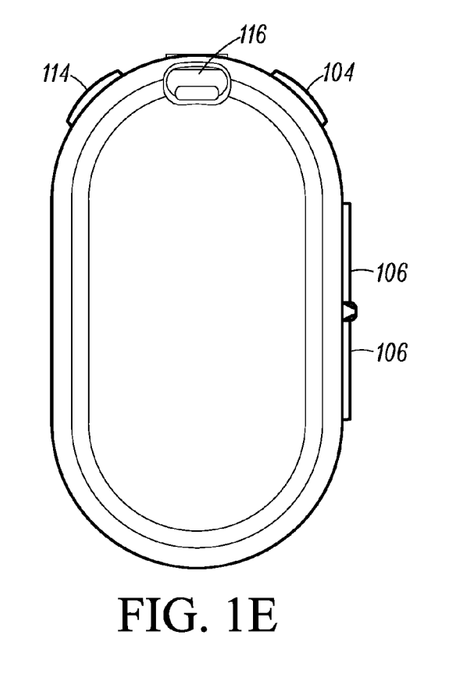

Portable radio 100 further includes volume up-down button 106, an accessory connector 108, and a push-to-talk (PTT) button 110, as shown in FIG. 1A, FIG. 1B and FIG. 1C. Battery contacts 112 and a menu button 114 are shown in FIG. 1D. Menu button 114 provides access to pre-programmed features: channel, monitor scan and call tone. A lanyard 116 may also be included as seen in FIG. 1E. While the placement of the various buttons has been located for optimum user ease, it will be appreciated that other button locations may also be used. The placement of the single multicolor LED however, has been strategically placed on the front of the radio 102, so that the status indicator can be viewed not only by the user of the device but by others as well. In some embodiments it may be desirable to have the LED 102 illuminating a company logo, name or other identifier 112 for further brand identification.

In accordance with some embodiments, the menu button 114 in conjunction with the volume up/down button 106 enables channel change control, while the power button 104 enables power on, power off and battery status. The single multicolor LED 102 is responsive to these predetermined button presses to provide radio status indicators. In accordance with the embodiments, the single multicolor LED 102 provides portable radio status in the form of battery status and a channel status by illuminating different colors and different pulsing rates.

The battery status can be checked by pressing the power button 104 for a predetermined amount of time. A short power button press is used to check the battery status, while a longer power button press turns the radio on and off. In response to the power button 104 being pressed, the multicolor LED 102 glows for a predetermined amount of time with a predetermined color to represent battery status. Examples of predetermined colors for the battery status are provided below:

Green—high level battery charge
Yellow—medium level battery charge
Red—Low level battery charge
Red blinking—critical low level battery charge Once the portable radio 100 is turned on and battery status has been indicated by LED 102, the LED automatically begins pulsating the current channel color. The current channel color can be viewed by the user as well as others working in the same environment.

In order to change channels, a user presses the menu button 114. Each press of the menu button 114 results in an audio announcement announcing the various menu settings, such as channel, monitor, scan and call tone. Pressing the PTT 110 will exit the menu or alternatively, a time-out timer within the radio will also exit the menu.

Figure 2:
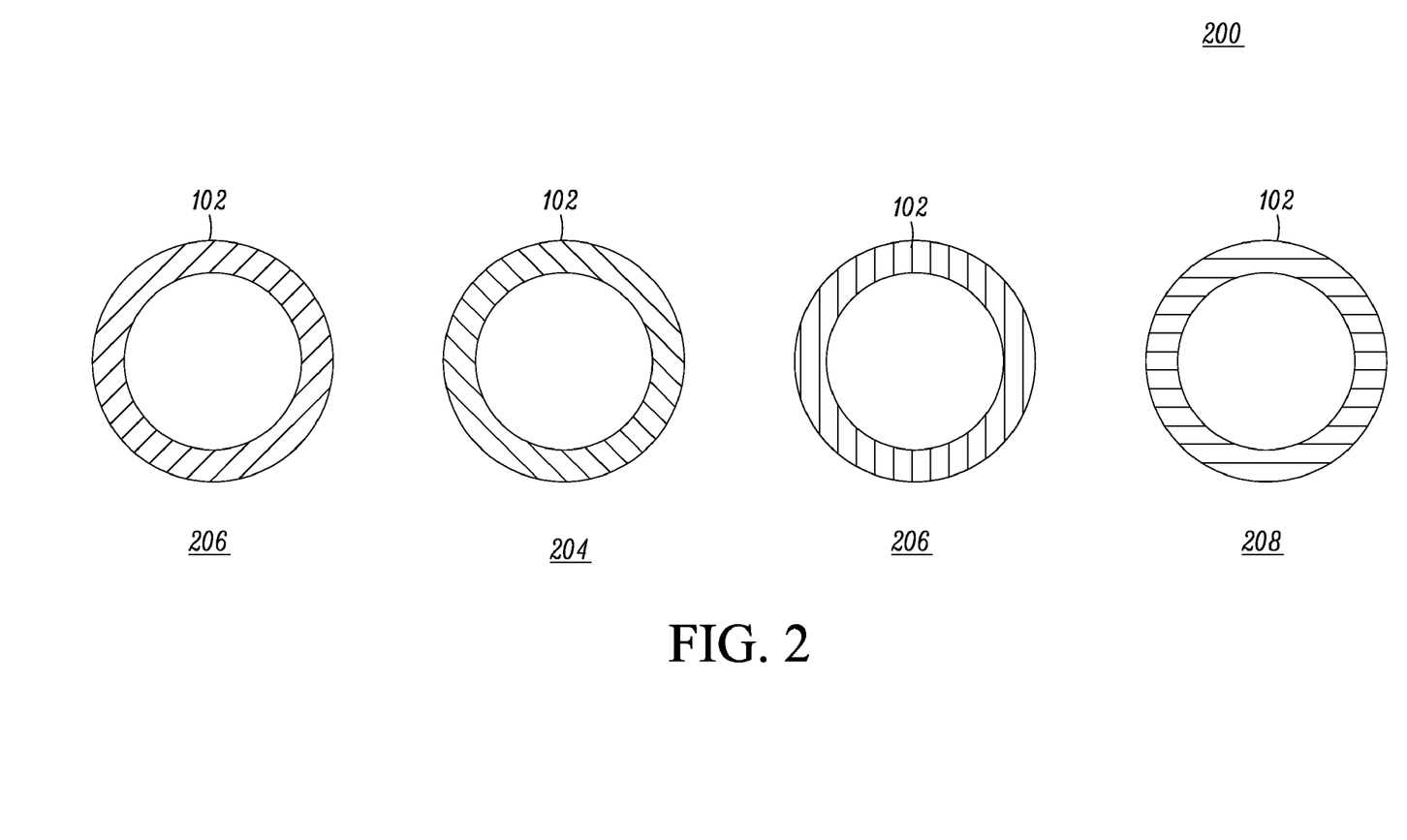
FIG. 2 is the portable two-way radio of FIG. 1 with differing channel change indicator status provided by a single multicolor LED in accordance with some embodiments.
Figure 3:
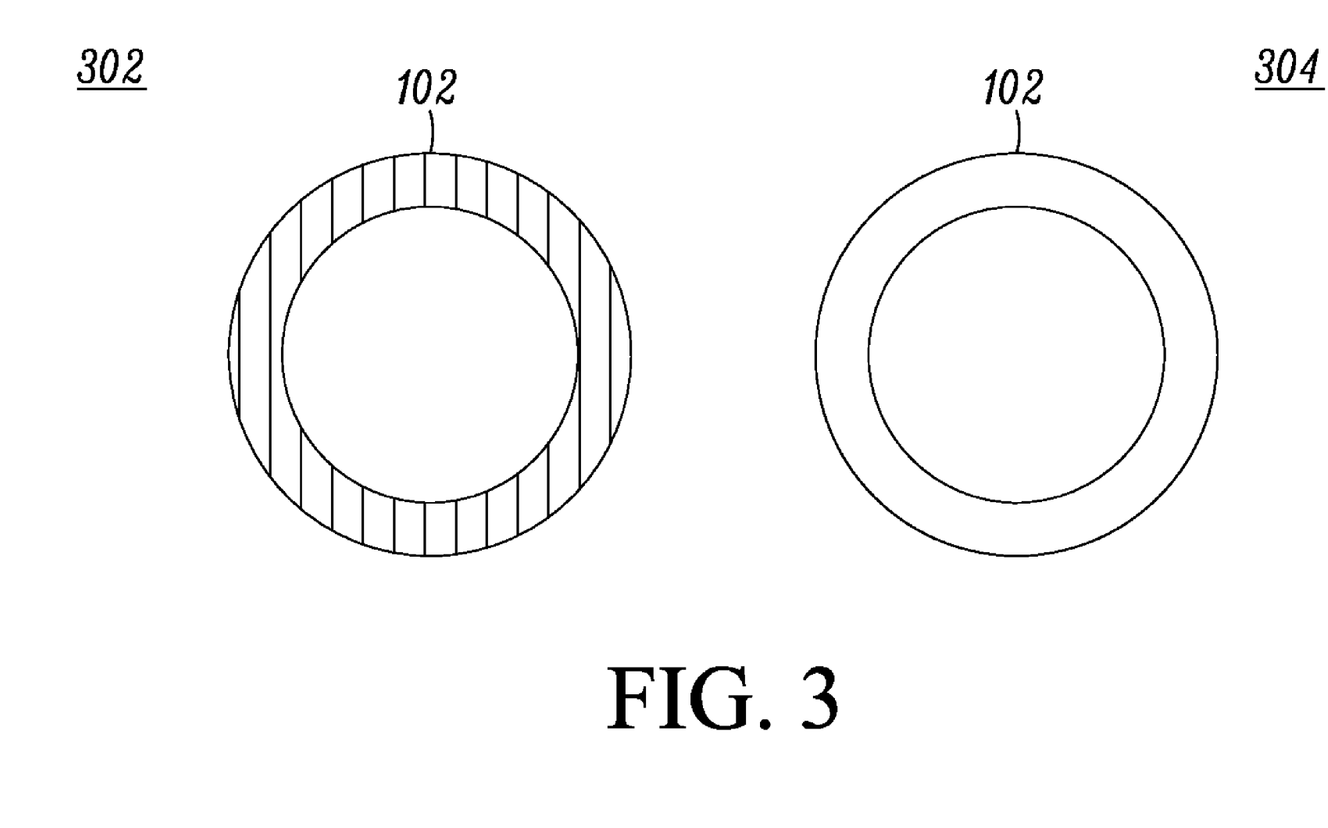
FIG. 3 is the communication device of FIG. 1 with the single multicolor LED being pulsed on and off in accordance with some embodiments.

Once the channel announcement is made, the volume up-down button 106 is used to select the channel setting from a plurality of color coded channel settings. FIG. 2 shows the portable radio 100 having the single multicolor LED 102 providing various channel settings 200 in accordance with some embodiments. Setting 202 shows LED 102 indicating a first color to represent a channel grouping (e.g. a blue channel grouping). Setting 204 shows LED 102 indicating a second color to represent a different channel grouping (e.g. a green channel grouping). Setting 206 shows LED 102 indicating a third color to represent another channel grouping (e.g. yellow grouping). Setting 208 shows LED 102 indicating a fourth color to represent yet another channel grouping (e.g. purple channel grouping). FIG. 3 shows the portable radio 100 with the LED 102 pulsed on at view 302 and off at view 304. Pulsing the single color represents the current channel being used. When the portable radio 100 is transmitting, the LED maintains the same color but remains on (without pulsing). So for example, a flashing blue LED might indicate a user is currently in the blue channel group. When the user presses the PTT button to transmit, the LED 102 will maintain a solid blue throughout the transmission.

Accordingly, radio status indicators are automatically provided by pulsing the LED 102 using a single color at a first predetermined rate to indicate the current channel; pulsing the LED at a second predetermined rate to indicate receive mode; presenting a solid LED color to indicate transmit mode; and changing the LED color to indicate a change in channel. Thus, use of the single multicolor LED allows a compact radio form factor with visual user interface. The use of the single multicolor LED 102 in conjunction with the power button 104 to provide battery status, and the use of the single multicolor LED 102 in conjunction with the menu button 104 and volume up/down button 106 to control channel change provide for multiplexed controls which minimize the number of overall controls needed for the radio's compact form factor. The status of other menu options can also be enabled via the menu button 104 and visually represented by LED 102. For example, a radio having a scan mode can have the scan mode enabled by pressing the menu button 114 until a scan announcement is made which will result in the LED 102 scrolling through all the colors associated with the various channels. Thus, the use of multiple colors from the single multicolor LED 102 provides a user with a friendly visual approach to operating the radio.

Figure 4:
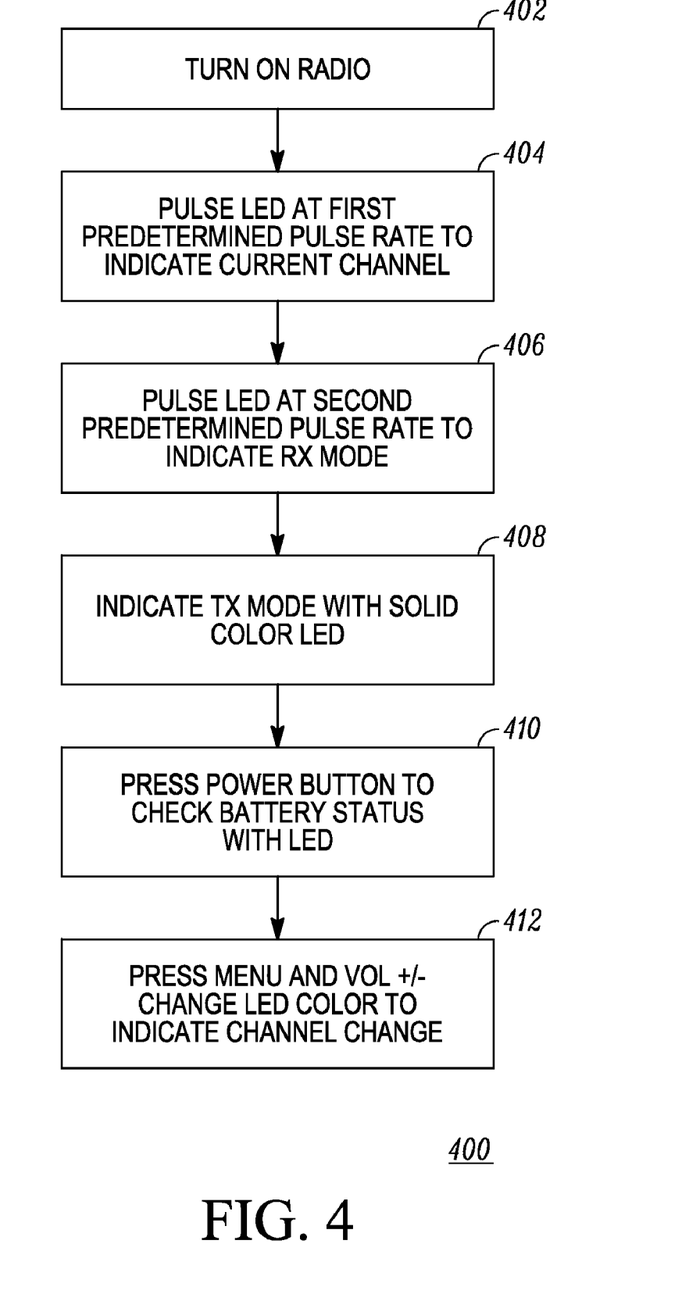
FIG. 4 is flowchart illustrating a method of providing radio status indicators on the portable two-way radio formed in accordance with some embodiments.

FIG. 4 is flowchart illustrating a method of providing status indication on a portable communication device formed in accordance with the embodiments. FIG. 4 is described in conjunction with the elements called out in FIG. 1. Method 400 begins at step 402 by turning on the radio 100 by pressing the power button 104 for a predetermined amount of time. Once the radio 100 is powered up, the LED 102 pulses at a first predetermined pulse rate to indicate the radio's current channel at 404. The remaining steps are provided to describe the LED representation of the radio's various operating modes and may take place in a different order than that described and shown.

At 406, the LED 102 is pulsed at a second predetermined rate to indicate receive mode at 406. The LED 102 emits a solid (non-pulsed) color during transmit mode at 408. Transmit mode is enabled as a result of the PTT being pressed. Battery status is checked at 410 by pressing the power button 104 for a predetermined amount of time. This power button press is a "short" keypress as compared to the power up or power down keypress. At step 412, the color of the LED 102 changes in response to a channel change being made. The channel change is made by having the user press the menu button 114, listen for the channel option, and then scroll through the channels using the up/down buttons 106 to select the desired color coded channel. Other menu options can be assigned to predetermined color and pulsing configurations of LED 102.

Figure 5:
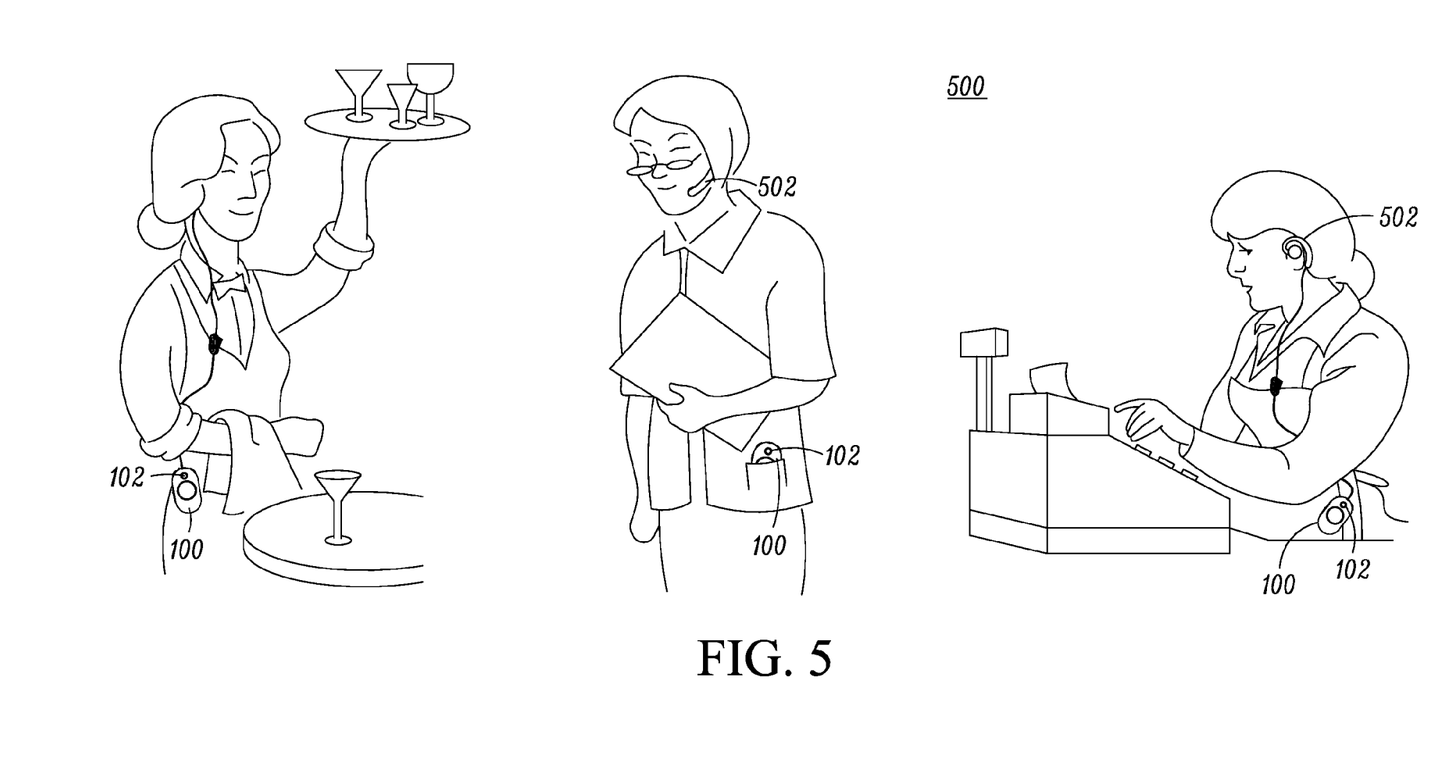
FIG. 5 illustrates a plurality of portable two-way radios formed in accordance with some embodiments operating in a business environment.

FIG. 5 illustrates a plurality of portable two-way radios (also referred to as half-duplex radios) formed in accordance with some embodiments operating in a business environment, such as a retail or restaurant environment 500. In the embodiment of FIG. 5, the portable radios 100 are being used in conjunction with electronic accessories, such headsets and earpiece accessories 502. Electronic accessories 502 are electrically coupled to the portable radios 100 via either wired or wireless links. For example, the wireless link may be provided via Bluetooth technology. Multiple users utilizing these devices can determine which color channel grouping their colleagues are in and switch over to that grouping as desired. If a user wishes to join another channel grouping, (say to from the yellow group to the blue group) the user simply presses the menu button 114 followed by pressing the volume up/down button 106 to scroll through the various channels represented by colors. As a further embodiment, the single multicolored LED 102 may be situated about a perimeter of a company logo disposed on the portable radio 100 further enhancing the brand name to employees and customers alike.

Accordingly, there has been provided a portable communication device which facilitates communication needs in a variety of environments, such as restaurant and retail segments. The use of the status indicator formed in accordance with the embodiments, provides a utility radio with a user interface having a personal, palm-sized device which redefines the traditional form factor by including only essential elements within the radio. The portable communication device is smaller and lighter than other radios in its class. The status indicator provides an easy to interpret user interface in the form of channel change and battery status with the benefit of reduced cost achieved by the removal of the display and channel control knob. Channels are associated with color instead of numbers or letters by a single multicolor LED. Using the status indicator to illuminate the product logo provides a further benefit of brand identification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized controllers (or "controlling devices") such as microcontroller, customized controllers and unique stored program instructions (including both software and firmware) that control the one or more controllers to implement, in conjunction with certain non-controller circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject Those skilled in the art will appreciate that the above recognized advantages and other advantages described herein are merely exemplary and are not meant to be a complete rendering of all of the advantages of the various embodiments of the present invention.

We claim:

1. A portable radio, comprising:
   a housing having a single multicolor LED disposed thereon, the housing having no display and no dedicated channel control knob;
   the single multicolor LED providing a plurality of radio status indicators, including:
     a single first-rate pulsing LED color indicating channel status and that the radio is not currently in a transmit mode or a receive mode;
     a single solid LED color indicating channel status and that the radio is in a transmit mode;
     a single second-rate pulsing LED color indicating channel status and that the radio is in a receive mode; and
     one of a plurality of predetermined solid LED colors or blinking LED colors indicating battery status while the radio is already powered on;
   wherein the single multicolor LED provides an indication of both a channel status and a battery status, and which one of the channel status and the battery status is currently being indicated is a function of a state of an externally available power button.

2. The portable radio of claim 1, further comprising:
a menu button for controlling a plurality of menu settings associated with the portable radio, the plurality of menu settings comprising: channel change and at least one other setting.

3. The portable radio of claim 2, wherein an audio announcement announces a menu setting in response to the menu button being pressed.

4. The portable radio of claim 3, further comprising:
a volume up-down button that also controls channel change after the menu button is pressed.

5. The portable radio of claim 4, wherein the single multicolor LED changes color in response to channel changes caused by operation of the volume up-down button.

6. The portable radio of claim 1, wherein the externally available power button turns the portable radio on and off in response to being pressed for a first predetermined amount of time and causes the single multicolor LED to switch from indicating channel status to indicating the battery status in response to being pressed for a second predetermined amount of time.

7. The portable radio of claim 6, wherein the single multicolor LED indicates scan mode by scrolling through a plurality of predetermined colors in response to a scan menu selection.

8. A half-duplex radio, comprising:
a housing without channel knob and without a display;
a push-to-talk (PTT) button;
a power button for powering on and off the half-duplex radio when pressed for a predetermined amount of time, the power button also enabling a battery status indication of the half-duplex radio when pressed for a second predetermined amount of time and the radio is already powered on;
a menu button to provide a plurality of radio operating modes;
a volume up-down button, the volume up/down button controlling volume and also providing channel change control in response to the menu button being pressed; and
a single multicolor LED located on the housing to indicate a plurality of radio status indicators, the plurality of radio status indicators comprising battery status in response to the power button being pressed for a predetermined amount of time and channel status in response to the menu button and volume up/down buttons being pressed;
wherein transmit mode is indicated by a single solid color LED indicating channel status and that the radio is in transmit mode in response to the PTT being pressed;
wherein receive mode is indicated by a single first-rate pulsing LED color indicating channel status and that the radio is in a receive mode;
wherein channel status mode is indicated by a single second-rate pulsing LED color indicating channel status and that the radio is not currently in a transmit mode or a receive mode;
wherein battery status is indicated by:
a solid green color for high level charge;
a solid yellow to indicate medium level charge;
a solid red color for low level charge; and
a blinking red color for critically low charge; and
wherein the single multicolor LED provides an indication of both a channel status and a battery status, and which one of the channel status and the battery status is currently being indicated is a function of a state of an externally available power button.

* * * * *